E. T. ROGERS.
Water-Filter.
No. 202,471. Patented April 16, 1878.
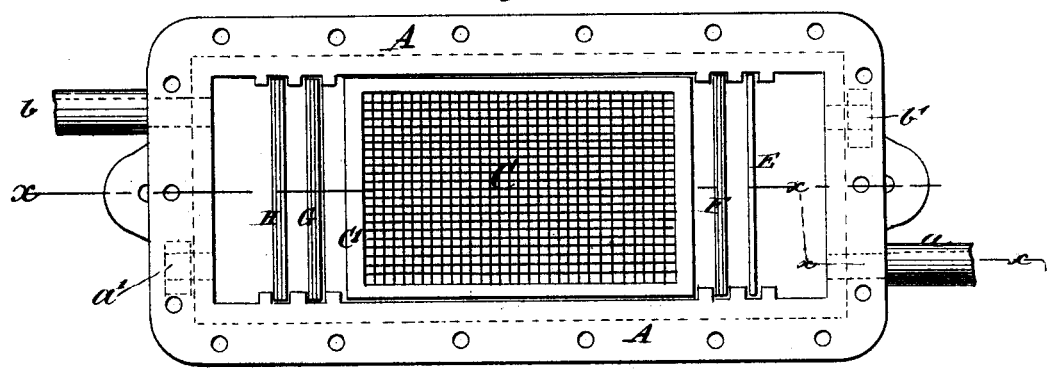
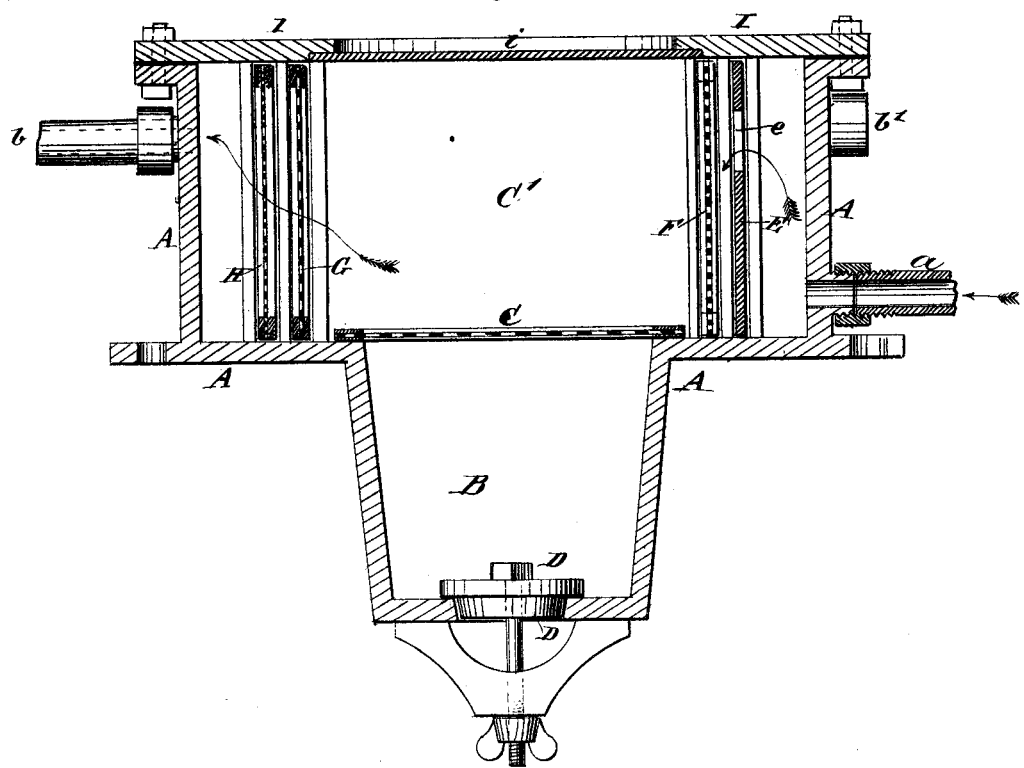
WITNESSES:
Chas. Nida
C. Sedgwick
INVENTOR:
E. T. Rogers
BY Munn & Co
ATTORNEYS.

UNITED STATES PATENT OFFICE.

ENOS T. ROGERS, OF NEW YORK, N. Y.

IMPROVEMENT IN WATER-FILTERS.

Specification forming part of Letters Patent No. 202,471, dated April 16, 1878; application filed March 16, 1878.

*To all whom it may concern:*

Be it known that I, ENOS TRUMAN ROGERS, of the city, county, and State of New York, have invented a new and Improved Water-Filter, of which the following is a specification:

The object of my invention is to furnish a simple, cheap, and efficient filter for the feed-water of high-pressure steam-engine boilers, and for other boilers requiring filtered water.

The invention consists in the combination of a vertical breakwater-plate and one or more vertical screens at the inlet end of the filter, and one or more vertical screens at the outlet end of the filter, with a central charcoal-chamber and a sub-central sediment-receptacle, as will be hereinafter described.

In the accompanying drawing, Figure 1 represents a top or plan view of my improved water-filter, the cover being removed. Fig. 2 is a longitudinal vertical section of the same taken on the line $x\ x$ of Fig. 1.

Similar letters of reference indicate corresponding parts.

A is a cast-iron box or vessel having two inlets, $a\ a'$, and two outlets, $b\ b'$, one inlet and one outlet being arranged at either end of the box or filter A.

The vessel A is provided with a sub-central hopper-shaped extension, B, of its bottom, said hopper B being covered by a skeleton-plate, C, and being closed at its lower end by a hand-hole plate, D.

At suitable distance from the inlet-pipe $a$, between the same and the skeleton-plate C, is a vertical breakwater-plate, E, with a port or opening, $e$, above its center. Between the plates E and C is a vertical strainer or screen, F. In the other end of the filter, between the skeleton-plate C and the outlet-pipe $b$, are similarly-arranged vertical strainers or screens G H. The screens F G H are of different fineness, the screen F being the coarsest and the screen H, nearest the outlet, being the finest.

The breakwater-plate E and all the vertical screens are fitted in ways on the inside of the walls of the box A, so that they can be removed, and the set in one end of the filter replaced by the set in the other end, when it is desirable, for accommodating the connections with the filter, to use the pipes $a'\ b'$ for the inlet and outlet pipes.

The central chamber C' between the screens F and G is charged with charcoal, heaped upon the skeleton-plate C, through which the sediments are deposited into the receptacle B, from which they may be removed by opening the hand-hole plate D, or by connecting the outlet-pipe with the sewer, and let a current of steam blow through the filter from the inlet-pipe.

The supply-water enters the filter through the inlet-pipe $a$, strikes the plate E, and passes through its port $e$, thence successively through the screen F, the central charcoal-chamber and the screens G and H, to the outlet-pipe $b$, and thence to the feed-pump, which brings it cleansed and pure to the boiler.

The arrows on the drawing indicate the course of the water.

The cover I of the filter is provided with a pane, $i$, to facilitate inspection of the interior.

The water-filter, as described, presents a simple and cheap device for securing the well-known advantages of pure water for the generation of steam.

Having thus described my invention, I claim as new and desire to secure by Letters Patent—

The combination of the vertical breakwater-plate E, and one or more vertical screens, F, at the inlet end of the filter, and one or more vertical screens, G H, at the outlet end of the filter, with the central charcoal-chamber C', and the sub-central sediment-receptacle B, substantially as and for the purpose set forth.

ENOS TRUMAN ROGERS.

Witnesses:
  J. N. ROGERS,
  CHAS. LENT, Jr.